(12) United States Patent
Gehrmann

(10) Patent No.: US 8,064,597 B2
(45) Date of Patent: Nov. 22, 2011

(54) METHOD AND SYSTEM FOR MOBILE DEVICE CREDENTIALING

(75) Inventor: Christian M Gehrmann, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1026 days.

(21) Appl. No.: 11/948,352

(22) Filed: Nov. 30, 2007

(65) Prior Publication Data

US 2008/0260149 A1   Oct. 23, 2008

Related U.S. Application Data

(60) Provisional application No. 60/913,090, filed on Apr. 20, 2007.

(51) Int. Cl.
*H04L 29/00* (2006.01)
(52) U.S. Cl. .............................. 380/247; 455/419; 705/1
(58) Field of Classification Search .................. 380/247; 455/419; 705/1
See application file for complete search history.

(56) References Cited

U.S. PATENT DOCUMENTS

| | | | |
|---|---|---|---|
| 5,600,708 | A | 2/1997 | Meche et al. |
| 5,943,425 | A | 8/1999 | Mizikovsky |
| 5,956,636 | A | 9/1999 | Lipsit |
| 6,014,561 | A * | 1/2000 | Molne ........................ 455/419 |
| 6,064,879 | A | 5/2000 | Fujiwara et al. |
| 6,144,849 | A | 11/2000 | Nodoushani et al. |
| 6,314,283 | B1 | 11/2001 | Fielden |
| 6,381,454 | B1 | 4/2002 | Tiedemann, Jr. et al. |
| 6,445,914 | B1 | 9/2002 | Findikli et al. |
| 6,480,710 | B1 | 11/2002 | Laybourn et al. |
| 6,484,022 | B1 | 11/2002 | Findikli et al. |
| 6,490,445 | B1 | 12/2002 | Holmes |
| 6,529,729 | B1 | 3/2003 | Nodoushani et al. |
| 6,546,243 | B2 | 4/2003 | Tiedemann, Jr. et al. |

(Continued)

FOREIGN PATENT DOCUMENTS

EP   0778716  A2   6/1997

(Continued)

OTHER PUBLICATIONS

3GPP TS 24.008, V7.0.0 (Jun. 2005). 3rd Generation Partnership Project; Technical Specification Group Core Network and Terminals; Mobile radio interface Layer 3 specification; Core network protocols; Stage 3 (Release 7).

(Continued)

*Primary Examiner* — Vivek Srivastava
*Assistant Examiner* — Thong Truong
(74) *Attorney, Agent, or Firm* — Coats & Bennett, P.L.L.C.

(57) ABSTRACT

Methods and systems taught herein allow mobile device manufacturers to preconfigure mobile devices for subscription with any network operator having access to a centralized device directory server. The directory server stores device records, each including a preliminary subscription identity. Manufacturers individually provision new mobile devices with these preliminary subscription identities, and network operators preliminarily register subscribers by submitting requests to the directory server that cause it to link individual device records with the appropriate credential server addresses. Mobile devices gain temporary network access by submitting their preliminary subscription identities, which get passed along to the directory server for verification. In turn, the directory server generates authentication vectors giving the mobile devices temporary network access, and returns the appropriate credential server addresses. The mobile devices use the address information to submit secure requests for permanent subscription credentials, and the involved credential servers securely return permanent subscription credentials responsive to valid requests.

18 Claims, 4 Drawing Sheets

U.S. PATENT DOCUMENTS

| | | |
|---|---|---|
| 6,549,770 B1 | 4/2003 | Marran |
| 6,725,033 B2 | 4/2004 | Holmes |
| 6,980,660 B1 | 12/2005 | Hind et al. |
| 7,006,831 B2 | 2/2006 | Matz et al. |
| 7,035,630 B2 | 4/2006 | Knowles |
| 7,200,390 B1 | 4/2007 | Henager et al. |
| 2002/0009199 A1* | 1/2002 | Ala-Laurila et al. ......... 380/247 |
| 2002/0094808 A1 | 7/2002 | Tiedemann, Jr. et al. |
| 2003/0226030 A1 | 12/2003 | Hurst et al. |
| 2004/0116109 A1 | 6/2004 | Gibbs et al. |
| 2005/0079863 A1 | 4/2005 | Macaluso |
| 2006/0009217 A1 | 1/2006 | Lunden et al. |
| 2006/0030315 A1 | 2/2006 | Smith et al. |
| 2006/0165060 A1 | 7/2006 | Dua |
| 2006/0196931 A1 | 9/2006 | Holtmanns et al. |
| 2006/0217111 A1 | 9/2006 | Marolia et al. |
| 2007/0047707 A1 | 3/2007 | Mayer et al. |
| 2007/0056042 A1 | 3/2007 | Qawami et al. |
| 2007/0099599 A1 | 5/2007 | Smith et al. |
| 2007/0100652 A1* | 5/2007 | Ramer et al. .................... 705/1 |
| 2007/0112676 A1 | 5/2007 | Kontio et al. |
| 2007/0129057 A1 | 6/2007 | Xu et al. |

FOREIGN PATENT DOCUMENTS

| | | |
|---|---|---|
| EP | 0820206 A2 | 1/1998 |
| EP | 1645931 | 4/2006 |

OTHER PUBLICATIONS

Niemi, V. et al. UMTS Security. Wiley, Jan. 2004. pp. 63-71. ISBN: 978-0-470-84794-7.

Alves, T. et al. "TrustZone: Integrated Hardware and Software Security." White Paper, ARM. Available at http://www.arm.com/pdfs/TZ_Whitepaper.pdf.

TCG Mobile Trusted Module Specification. Specification version 0.9, Revision 1, Sep. 12, 2006. TCG 2006. Available at www.trustedcomputinggroup.org.

Co-pending U.S. Appl. No. 60/913,089, filed Apr. 20, 2007.

* cited by examiner

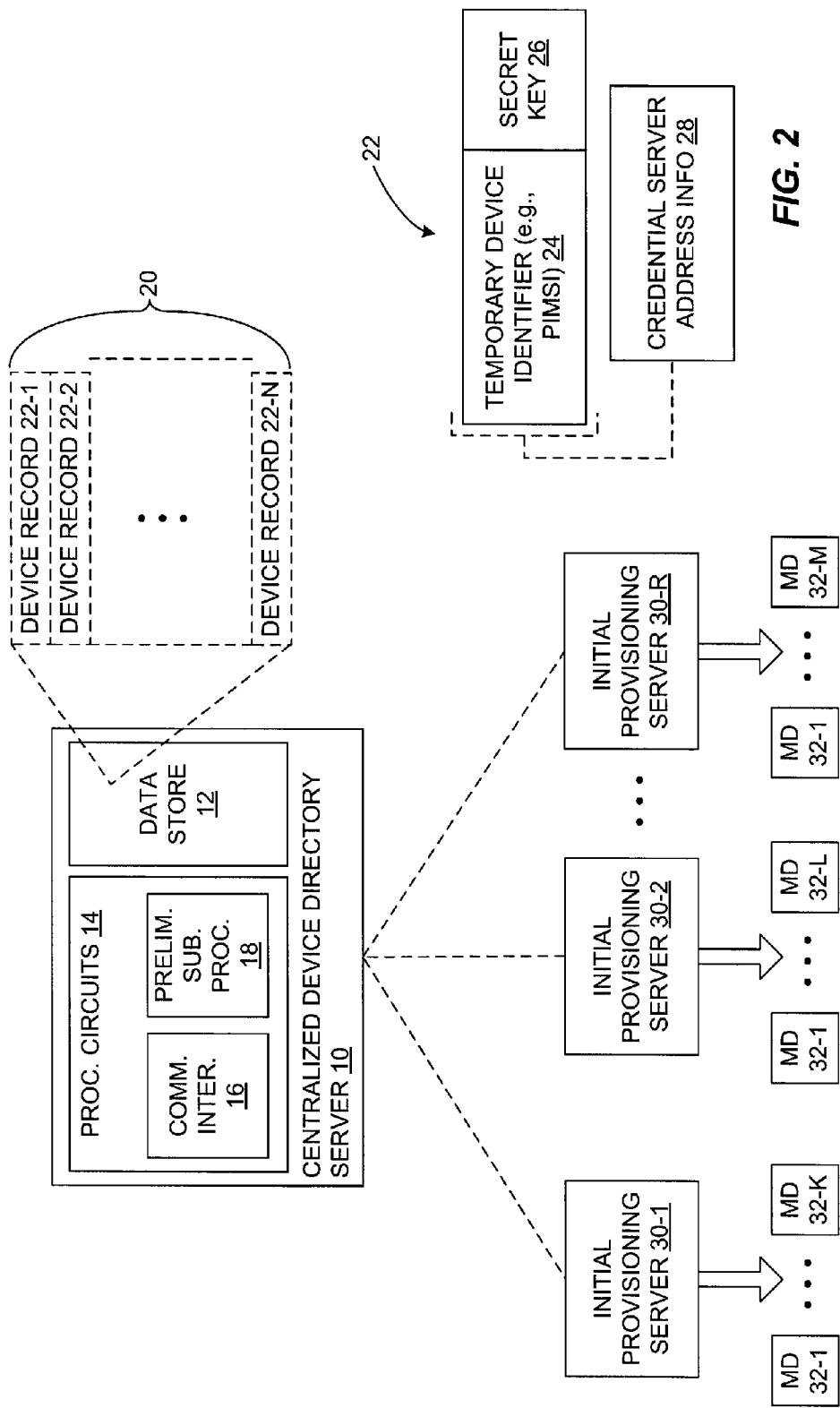

METHOD AND SYSTEM FOR MOBILE DEVICE CREDENTIALING

RELATED APPLICATIONS

This application claims priority under 35 U.S.C. §119(e) from the U.S. Provisional Patent Application Ser. No. 60/913,090, which was filed on 20 Apr. 2007 and entitled "OTA Soft SIM Credential Provisioning."

BACKGROUND

1. Technical Field

The present invention generally relates to provisioning mobile devices, and particularly relates to facilitating over-the-air activation of mobile devices through the use of preliminary subscription identity information maintained in a centralized device directory that is accessible by one or more network operators.

2. Background

Efficient equipment manufacture, distribution, and activation are key enablers for effectively exploiting the range of business opportunities provided by the continuing revolution in wireless communications. The existing approaches to "provisioning" user equipment with the necessary subscription credentials represent one impediment to more efficient operations.

For example, one conventional approach relies on selling or otherwise distributing user equipment with installed Subscriber Identity Modules, SIMs. Each SIM comprises a tamper-resistant circuit module, commonly embodied in a small, card-like form factor, where the circuit module stores credential information for a specific network operator. In other words, the user equipment is tied to a particular network operator by virtue of the preprogrammed SIM, and the subscriber calls or otherwise contacts the network operator to provide billing information, etc. In response, the network operator marks that SIM as active in one or more subscriber databases, thereby making the user equipment operational.

Other approaches to automating the provisioning process, at least partially, have been proposed. Examples include U.S. Publication 2005/0079863 to Macaluso, which discloses a form of over-the-air provisioning (commonly noted as "OTA" provisioning in the relevant literature); U.S. Publication 2007/0099599 to Smith, which discusses dynamic provisioning of wireless services and initial provisioning via access to an internet database; U.S. Pat. No. 6,980,660 to Hind, which discloses methods for initializing wireless communication devices using an enterprise database; and U.S. Pat. No. 6,490,445 to Holmes, which discloses the use of temporary access information in wireless equipment, to allow a form of restricted network access for over-the-air provisioning.

As a general proposition, however, it seems that the complexity of the overall problem framework has prevented the past approaches from providing an overall system and method that simplifies manufacturing, sales, and, ultimately, registration of mobile devices with regard to secure over-the-air provisioning.

SUMMARY

Methods and systems taught herein allow mobile device manufacturers to pre-configure mobile devices for subscription with any network operator having access to a centralized device directory server. In at least one embodiment, mobile devices are provisioned with temporary device identifiers, which are also held in a centralized device directory server that is accessible to any number of network operators. Advantageously, a mobile station can be granted temporary access through any participating network, and that access thus is used to obtain permanent subscription credentials, via cooperation with a credential server associated with the network operator that will issue the permanent subscription credentials.

Accordingly, a method of facilitating over-the-air mobile communication device activation comprises, at a centralized device directory server, storing a device record that comprises preliminary subscription credential information for a mobile device, and sending at least part of the preliminary subscription credential information securely to an initial provisioning party, for use in initially provisioning the mobile device. The initial provisioning party may be, for example, a mobile device manufacturer. The method continues with receiving a device identifier for the mobile device from a credential server of a given network operator associated with an intended end-user of the mobile device, and correspondingly linking network address information of the credential server to the device record.

The method continues with receiving a validation request from an authentication server, responsive to the mobile device attempting to access a wireless communication network using the preliminary subscription credential information. In response to the validation request, the directory server sends an authentication vector based on a secret key included in the preliminary subscription credential information to the authentication server, if the preliminary subscription credential information for the mobile device is valid. The method also includes the directory server subsequently receiving a credential server address request from the mobile device, and sending network address information for the credential server to the mobile device, as linked in the device record stored for the mobile device.

In another embodiment, a system for facilitating over-the-air mobile communication device activation includes a centralized device directory server. The directory server in this embodiment comprises one or more processing circuits configured to store a device record that comprises preliminary subscription credential information for a mobile device, and to send at least part of the preliminary subscription credential information securely to an initial provisioning party, for use in initially provisioning the mobile device. The directory server is further configured to receive a device identifier for the mobile device from a credential server of a given network operator associated with an intended end-user of the mobile device, and correspondingly link network address information of the credential server to the corresponding device record.

Continuing, the directory server is configured to receive a validation request from an authentication server, responsive to the mobile device attempting to access a wireless communication network using the preliminary subscription credential information, and to send an authentication vector based on a secret key included in the preliminary subscription credential information to the authentication server, if the preliminary subscription credential information for the mobile device is valid. Still further, the directory server is configured to receive a credential server address request from the mobile device, subsequent to the mobile device gaining temporary access to the wireless communication network via the authentication vector, and to correspondingly send network address information for the credential server to the mobile device, as linked in the device record stored for the mobile device.

In one or more of the above embodiments, the preliminary subscription credential information, also referred to as preliminary subscription identities, comprise pairings of secret keys and Preliminary International Mobile Subscriber Identities, abbreviated as PIMSIs. Thus, the device directory stores, for example, a batch of PIMSI and secret key pairs, and device manufacturers provision individual, mobile devices with individual PIMSI and secret key pairs.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of at least part of a system for facilitating over-the-air provisioning of mobile devices, including a centralized device directory server that provides preliminary subscription credential information to initial provisioning servers associated with, for example, device manufacturers.

FIG. 2 is a block diagram of one embodiment of a "device record" data element or structure, which includes a temporary device identifier and a secret key.

DETAILED DESCRIPTION

Figure 5:
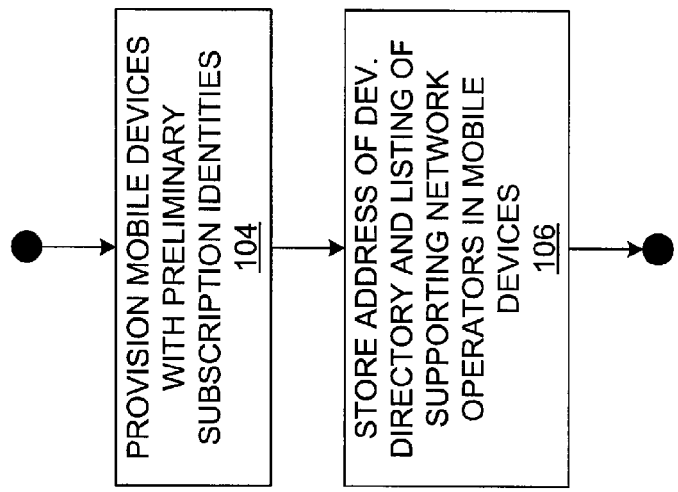
FIG. 5 is a logic flow diagram of one embodiment of processing logic that may be implemented at an initial provisioning server, for use in initially provisioning mobile devices based on information received or otherwise associated with preliminary subscription credential information stored in a centralized device directory server.

FIG. 1 illustrates one embodiment of a centralized device directory server 10 ("directory server 10"), as contemplated herein for facilitating over-the-air activation of mobile devices. The term "mobile device" should be construed broadly herein. By way of non-limiting example, the term encompasses cellular radiotelephones and other types of wireless mobile stations, and encompasses network access cards, and other wireless communication modules. Similarly, the term "activation" should be construed broadly, and the term at least refers to a method whereby a subscriber conveniently and securely obtains permanent (long-term) subscription credentials from the subscriber's associated network operator via an over-the-air provisioning process, even where the subscriber gains temporary network access through another network operator.

Better appreciating the flexibility and convenience of the activation system and method contemplated herein begins with a more detailed understanding of the directory server 10, in accordance with the example details illustrated in the figure. It includes or is associated with a data store 12, and includes one or more processing circuits 14. The processing circuits 14 include communication interfaces 16 and preliminary subscription processing circuits 18 ("subscription processing circuits 18"). The processing circuits 14 comprise hardware, software, or any combination thereof. For example, the processing circuits 14 may include one or more microprocessor-based circuits, which are configured to carry out the functions described herein by way of executing stored program instructions. Those instructions may be embodied as a computer program product retained, for example, in a computer-readable medium of the data store 12, or may be held in other memory/storage devices included in or associated with the directory server 10.

Other information stored at the directory server 10 includes a batch 20 of device records 22. Device records 22-1 through 22-N are illustrated, as an example. As shown in FIG. 2, in at least one embodiment, each device record 22 comprises preliminary subscription information for a mobile device. In one embodiment, each device record 22 includes a temporary device identifier 24 and a secret key 26. Also, as will be explained later, each device record 22 is linked to (e.g., includes or points to) credential server network address information 28. (Further, while not explicitly illustrated in the drawing, the directory server 10 may store a Public Device Identifier (PDI) in each device record 22. In one example, the PDI is obtained using a one-way "hash" function on the temporary device identifier 24.)

According to this basic setup, each device record 22 represents temporary subscription credentials for one mobile device. The directory server 10 is configured in one or more embodiments to generate batches 20 of device records 22, which can then be distributed to any number of parties involved in initially provisioning mobile devices. Typically, device records 22 are distributed to one or more mobile device manufacturers. In at least one embodiment herein, different batches 20 of device records 22 are generated for different manufacturers. For example, assuming that the temporary device identifier 24 is generated as a number, e.g., a Preliminary International Mobile Subscriber Identity (PIMSI), different ranges of numbers may be used for different device manufacturers. Doing so permits network elements involved in later over-the-air activation of a mobile device to determine the device's manufacturer from the range value of the temporary device identifier 24 reported by the mobile device.

Now, referring back to FIG. 1, one sees that the directory server 10 generates one or more batches 20 of device records 22, and distributes the device records 22 to an initial provisioning server 30 (or other computer system) at each of one or more mobile device manufacturers. Particularly, FIG. 1 illustrates initial provisioning servers 30-1 through 30-R, associated with different mobile device manufacturers 1 through R. Each provisioning server 30 receives some number of device records 22 from the device directory 10, and loads all or part of an individual device record 22 into a particular one of the mobile devices 32 being initially provisioned by it. This loading may be integrated into the manufacturing process.

Figure 3:
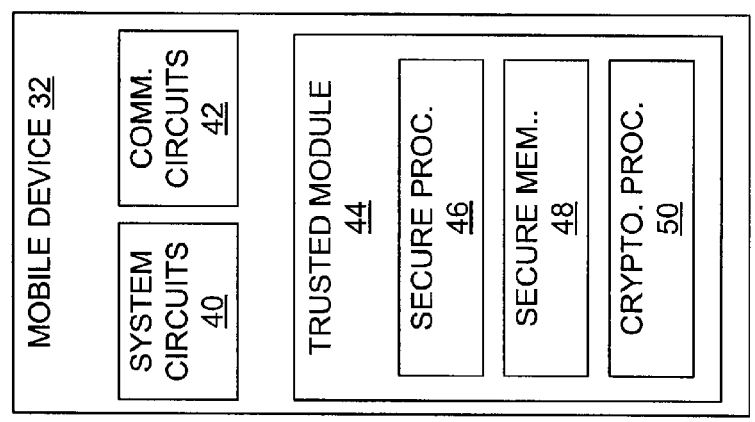
FIG. 3 is a block diagram of one embodiment of a mobile device.

Preferably, as shown in FIG. 3, each mobile device 32 includes system circuits 40 (processsors, user-interface circuits, etc.), communication circuits 42 (cellular, WLAN, WiFi, etc.), and a trusted module 44, such as configured according to ARM® TrustZone®, Mobile Trusted Module (MTM), or Trusted Platform Module (TPM) implementations. In one or more embodiments, the trusted module 44 includes, for example, a secure processor 46, secure memory 48, and a cryptographic engine 50. Other secure processing environments can be used, and the secure architecture details that are illustrated should not be construed as limiting the teachings presented herein.

In any case, an initial provisioning server 30 thus loads into a given mobile device 32, all or part of a device record 22, where that device record 22 is also held by the directory server 10. In this manner, a subscriber's later attempt to activate the mobile device 32 may be predicated on verifying the device record information as stored in the mobile device 32 against the corresponding device record information as stored in the directory server 10.

Figure 4:
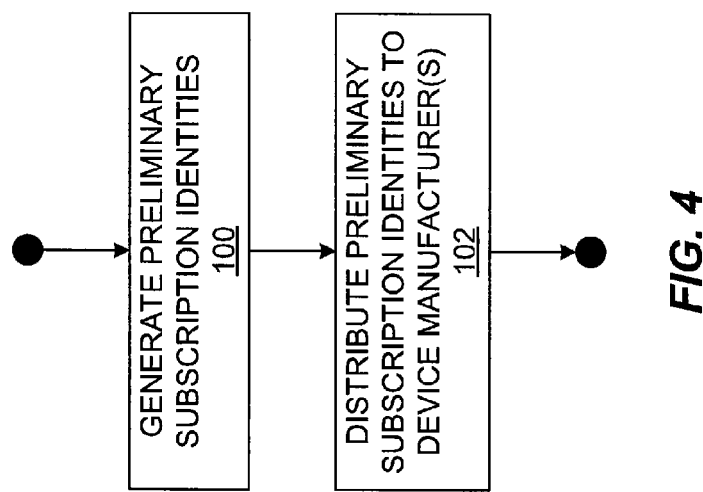
FIG. 4 is a logic flow diagram of one embodiment of processing logic that may be implemented at a centralized device directory server, for generating and distributing preliminary subscription identities for use in initially provisioning mobile devices.

FIGS. 4 and 5 summarize the above process, wherein, in FIG. 4, the directory server 10 generates preliminary subscription identities (Block 100) (e.g., generates device records 22 comprising pairs of PIMSIs 24 and secret keys 26). The directory server 10 then distributes the preliminary subscription identities to mobile device manufacturers (Block 102). That operation may be a "push" from the directory server 10, or a "pull" from the directory server 10, with all such transfers subject to appropriate security verification, etc. Communications between the directory server 10 and the initial provisioning servers 30 may be Internet-based, or based on some other network connectivity.

Regardless, the directory server 10 generates individual device records 22, each including a temporary device identifier 24 and a secret key 26 (denoted as "$K_p$") as a pair. As noted, the temporary identifier 24 may comprise a PIMSI. In at least one embodiment, the PIMSI is equal to the UMTS/GSM IMSI number, such that standard mobile terminal authentication procedures can be used for the PIMSI. The directory server 10 thus sends PIMSI/$K_p$ pairs to initial provisioning servers 30 as the device records 22. For example, multiple device records 22 are sent as PIMSI$_1$/$K_{p1}$, PIMSI$_2$/$K_{p2}$, . . . , and so on. The directory server 10 also may send its network address information, or the initial provisioning server 30 may be configured with that information.

FIG. 5 illustrates that the initial provisioning server 30 of a given mobile device manufacturer supports provisioning individual mobile devices 32 using the preliminary subscription information received from the directory server 10 (Block 104). The initial provisioning server 30 also may load into each mobile device 32 network address information for the directory server 10, along with a listing of network operators that support use of the preliminary subscription information (Block 106). (This listing thus allows the mobile device 32 later to select an appropriate network operator, assuming multiple network operators provide coverage in the mobile's location, for carrying out over-the-air provisioning of the mobile device 32 with permanent subscription credentials.)

In more detail, the initial provisioning server 30 may be configured to generate a public/private key pair, denoted as PuK/PrK, using secure processing. In such embodiments, the preliminary subscription information for device record 22-$x$ thus would include PuK$_x$, PrK$_x$, K$_{px}$, and the temporary device identifier 24 (e.g., PIMSI$_x$). The initial provisioning processor 30 loads this information in the trusted module 44 of the mobile device 32. The initial provisioning server 30 also loads, as mentioned, a listing of network operators that support use of the preliminary subscription information, e.g., a listing of network operators that will accept the use of PIMSIs for gaining temporary network access. The initial provisioning server also may load network address information for the directory server 10.

More generally, it should be understood that, in one or more embodiments, the trusted module 44 of the mobile device 32 is provisioned with the temporary device identifier 24 (e.g., PIMSI$_x$) the secret key K$_{px}$, and the public/private key pair PuK$_x$/ PrK$_x$(for later use in over-the-air activation of the mobile device 32), and that all such values may be provided by the initial provisioning server 30, or that one or more of them may be self-generated by the mobile device 32. For example, in at least one embodiment, the mobile device 32 is configured to generate the public/private key pair PuK$_x$/PrK$_x$. The provisioning information also generally includes a listing of network operators that support temporary wireless communication network access via use of the temporary device identifier 24, and may optionally include network address information for the directory server 10.

Figure 6:
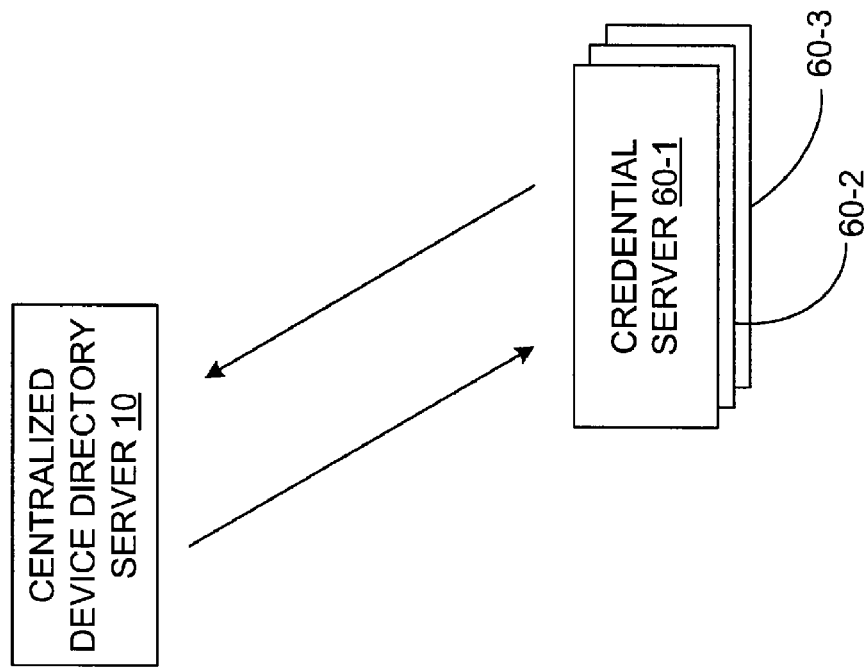
FIG. 6 is a block diagram of one embodiment of one or more credential servers that are communicatively coupled to a centralized device directory server, and are associated with one or more network operators.

At some later time, a given mobile device 32 is sold to or otherwise targeted for association with a subscriber of a given network operator. As an example illustration, FIG. 6 depicts three different credential servers 60-1, 60-2, and 60-3, which may represent credentialing elements from three different network operators. The illustrated credential servers 60 are communicatively coupled to the directory server 10, and are thus able to indicate to the directory server 10 which ones of the device records 22 held by the directory server 10 are to be associated with or otherwise linked to which ones of the credential servers 60.

Figure 7:
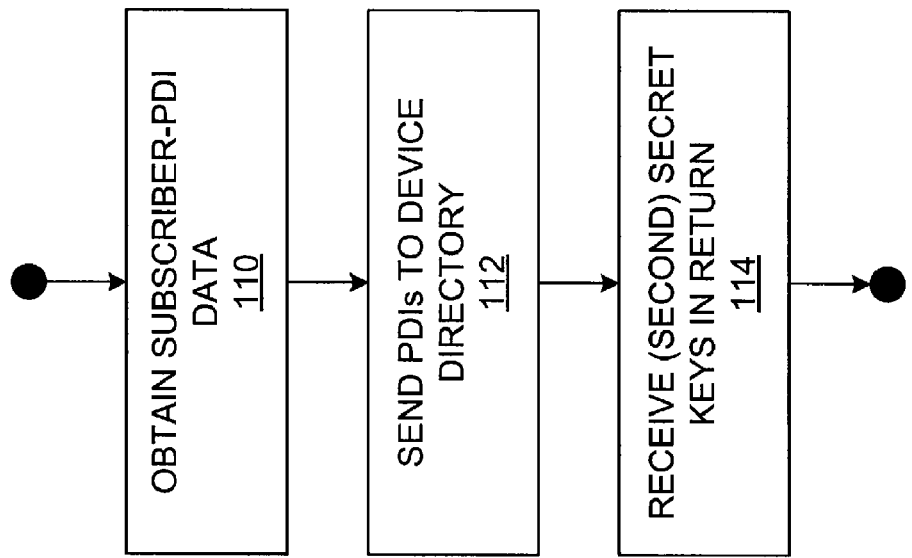
FIG. 7 is a logic flow diagram of processing logic that may be implemented at a credential server, for causing a centralized device directory server to associate particular preliminary subscription credential information held by the centralized device directory server for particular mobile devices to the credential server.

FIG. 7 illustrates an example embodiment, wherein the credential server 60-$x$ of a given network operator communicates with the directory server 10, e.g., via an Internet or other network connection. Particularly, the credential server 60-$x$ obtains or is otherwise provided with subscriber data (Block 110). For example, a sales or other computer system provides the credential server 60-$x$ with subscriber details for particular PDIs, where the PDIs correspond to individual device records 22 in the directory server 10. The credential server 60-$x$ thus may receive subscriber records, where each subscriber record includes details for a particular subscriber, along with a PDI and the address of the directory server 10 that holds the device record 22 corresponding to that PDI.

Thus, a PDI corresponding to a particular temporary device identifier 24 is associated with or otherwise linked to data for a particular subscriber at the credential server 60-$x$. This subscription data, which function as subscription credentials, also may include secret subscription values, like a UMTS "master key." In any case, processing continues with the credential server 60-$x$ sending PDI information to the directory server 10 (Block 112). Receipt of that PDI information causes the directory server 10 to associate or otherwise link the device records 22 corresponding to the received PDI information with the credential server 60-$x$.

The directory server 10 therefore is configured to receive a PDI from the credential server 60-$x$, and, in response, to link the device record 22 corresponding to the PDI with the credential server 60-$x$. As one example, the PDI is a one-way hash of a PIMSI, and the device directory 10 processes the PDI to obtain the corresponding PIMSI, and then uses the recovered PIMSI to index into one or more batches 20 of stored device records 22, to identify the device record 22 that matches the recovered PIMSI.

Once the correct device record 22 is identified, the directory server 10 links it to the credential server 60-x, e.g., it stores network address information for the credential server 60-x in the identified device record 22, or causes that device record 22 to "point" to the credential server 60-x. For each such linked PDI-device record 22, the credential server 60-x receives a second secret key to the credential server 60-x from the directory server 10 (Block 114). That second secret key is denoted as $K_t$ to indicate its temporary status. The directory server 10 derives from the secret key $K_p$ of the involved device record 22. For example, $K_t = F(K_p)$, where "F" denotes a suitable cryptographically strong one-way function. The credential server 60-x stores this temporary key $K_t$ with the rest of the subscriber data associated with the given PDI.

In the context of the above preliminary subscriber registration, given mobile device manufacturers may send PDIs and corresponding device directory address information directly to network operators. For example, an initial provisioning server 30 or other manufacturer's computer system may be communicatively coupled to the credential servers 60 of one or more network operators. Such communications allow mobile device manufacturers to link particular mobile devices 32 to particular network operators prior to any retail sales.

Additionally or alternatively, individual mobile devices 32 are shipped to their respective purchasers. The PDIs and device directory associations for those mobile devices 32 are provided to those purchasers, such as in written or electronic form accompanying the mobile devices themselves. Thus, once an end-user buys or otherwise obtains a particular mobile device 32, that end-user registers the PDI and device directory information of that mobile device 32 with the credential server 60 belonging to a network operator of choice.

Figure 8:
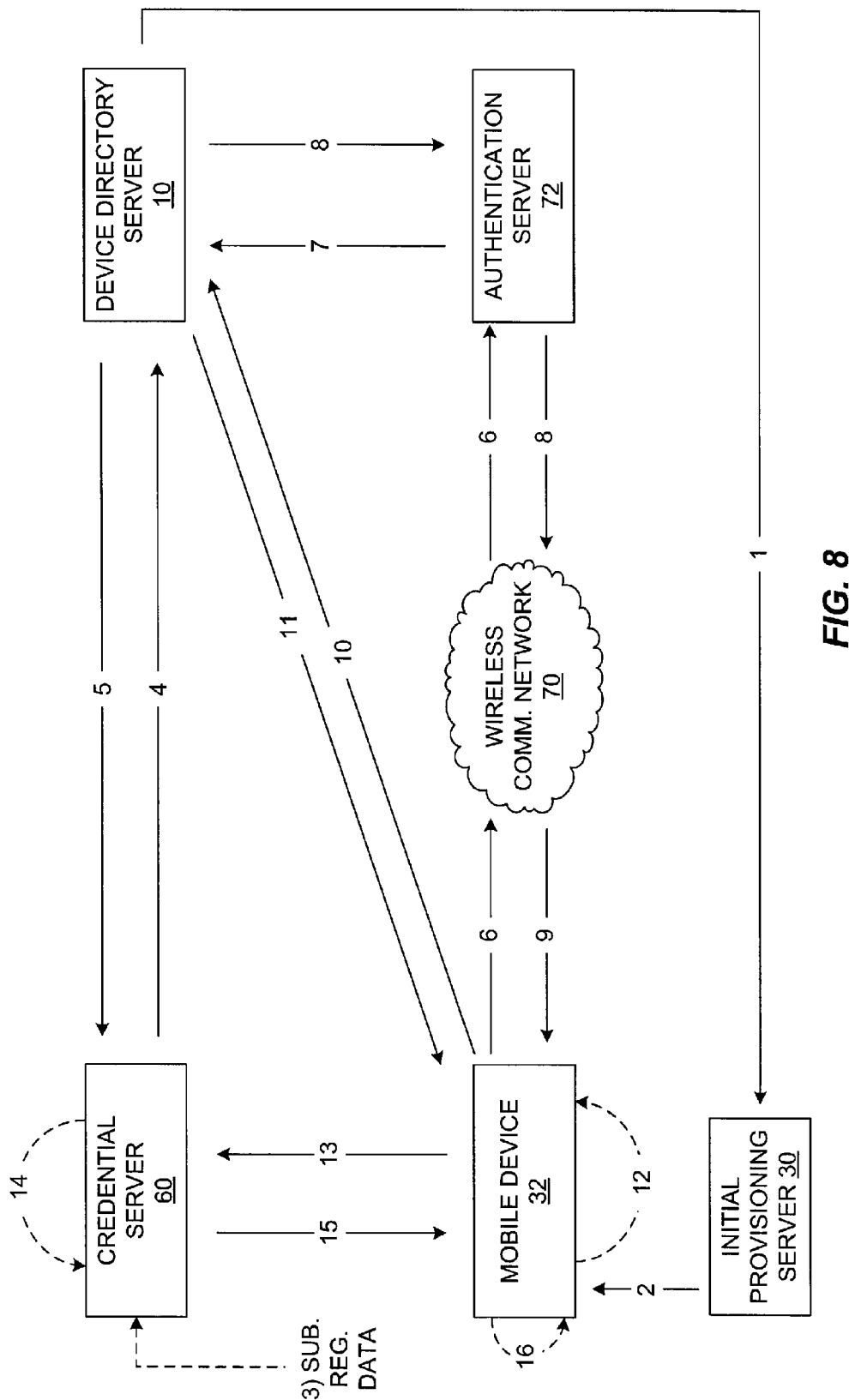
FIG. 8 is a block diagram illustrating one embodiment of an overall system for facilitating over-the-air provisioning of a mobile device, including a centralized device directory server.

FIG. 8 illustrates one embodiment of this end-user registration as part of an overall methodology contemplated herein. As illustrated at Step 1, a directory server 10 provides a PIMSI/secret key pair (PIMSI$_x$/K$_{px}$) to an initial provisioning server 30. The provided data matches a device record 22 stored within the directory server 10.

At Step 2, the initial provisioning server 30 generates a public/private key pair, PuK$_x$/PrK$_x$, and initially provisions an individual mobile device 32-x by loading it with PuK$_x$/PrK$_x$, K$_{px}$, PIMSI$_x$, network address information for the directory server 10, and a listing of participating network operators. Alternatively, the mobile device 32-x self-generates PuK$_x$/PrK$_x$, rather than those values being generated by the initial provisioning server 30.

At Step 3, an end-user or other subscriber associated with the mobile device 32-x submits subscriber registration data to the credential server 60. As an example, the credential server 60 receives subscriber identity and billing information, along with PDI$_x$, and network address or other identifying information for a directory server 10.

At Step 4, the credential server 60 submits PDI$_x$ to the directory server 10, thereby causing the directory server 10 to process PDI$_x$ and identify the corresponding device record 22-x, and link that device record 22-x to the submitting credential server 60.

At Step 5, the directory server 10 returns a temporary secret key, K$_{tx}$, to the credential server 60.

At Step 6, the mobile device 32-x contacts a wireless communication network 70 and provides it with its temporary device identifier 24, e.g., with PIMSI$_x$. More particularly, the mobile device 32-x may be configured to attempt to register with the wireless communication network 70 using standard GSM/UMTS registration procedures in which it provides its PIMSI$_x$ to the network 70 as part of registration. Further, the mobile device 32-x may be configured to determine that the network 70 is appropriate for such registration attempts, based on its stored listing of network operators that support use of temporary device identifiers 24 as a basis for gaining long-term subscription credentials via over-the-air provisioning.

Also, as part of Step 6, the network 70 passes the PIMSI$_x$ obtained from the mobile device 32-x to an authentication server 72. The authentication server 72 may be, for example, a Visitor Location Register (VLR) and/or a Home Location Register (HLR) associated with the network 70 or with a home network of a network operator associated with the mobile device 32.

At Step 7, the authentication server 72 recognizes the PIMSI$_x$ as a temporary identifier, and passes the PIMSI$_x$ to the appropriate directory server 10. In one or more embodiments, the authentication server 72 is configured to determine the network address information for the directory server 10 from the PIMSI$_x$ received from the mobile device 32-x.

At Step 8, the directory server 10 finds the correct data record 22-x corresponding to the PIMSI$_x$ as received from the authentication server 72. As part of this processing, the directory server 10 may determine the validity of the PIMSI$_x$ by checking whether the PIMSI$_x$ is blocked, expired, or has otherwise been used more than an allowed number of times. Thus, if the PIMSI$_x$ exists within the batch(es) 20 of device records 22 stored at the directory server 10 and is valid, the directory server 10 calculates a temporary authentication vector for the mobile device 32-x and returns the authentication vector to the authentication server 72.

In one or more embodiments, the device directory 10 is configured to derive the authentication vector using the secret key K$_{px}$ stored in the device record 22-x for the mobile device 32-x. In this regard, the device directory 10 can be configured to generate the authentication vector using standardized 3rd Generation Partnership Project (3GPP) procedures, such as the MILENAGE algorithm. Doing so increases interoperability. Regardless, Step 8 is shown continuing across the authentication vector 72, indicating that the authentication vector is passed back to the network 70.

At Step 9, the network 70 uses the authentication vector to grant temporary access, e.g., temporary packet data access, to the mobile device 32-x. As one example, the authentication vector is valid for a limited amount of time, e.g., one minute, and/or is valid for a very limited amount of data transfer.

At Step 10, the mobile device 32-x uses its temporary access to communicate with the directory server 10. In this regard, it was noted that network address information for the directory server 10 can be included as part of the mobile device's initial provisioning information. Thus, the mobile device 32-x can use that stored information to contact the appropriate directory server 10 after gaining temporary access. While the diagram appears to show communication directly between the mobile device 32-x and the directory server 10, those skilled in the art will appreciate that the link may be indirect, and, in general, includes an over-the-air connection being supported by the network 70 according to the temporary authentication vector. With its communicative link to the directory server 10, the mobile device 32-x requests that the directory server 10 provide it with the credential server address information linked at the directory server 10 to its PIMSI$_x$.

At Step 11, the directory server 10 returns the credential server address information to the mobile device 32-x.

At Step 12, the mobile device 32-x generates a new temporary key, K$_{tx}$. In at least one embodiment, the mobile device 32-x derives K$_{tx}$ from its secret key K$_{px}$.

At Step 13, the mobile device 32-x sends a credential request to the credential server 60, as identified by the credential server address information returned to the mobile device 32-x from the device directory 10. (Again, such communications generally are indirect, with at least one part of the link supported by an over-the-air connection made through the network 70.) In one embodiment, this request is protected using the temporary key $K_{tx}$, and, possibly, a Message Authentication Code (MAC). In another embodiment, the connection is protected by the temporary key $K_{tx}$ and a transport security protocol, such as TLS. Regardless, in at least one embodiment, the request includes the mobile device's public key $PuK_x$, and the $PDI_x$ corresponding to the mobile devices's $PIMSI_x$.

At Step 14, the credential server 60 creates permanent (long-term) subscription credentials for the mobile device 32. For example, if may generate a Soft Subscriber Identity Module (SSIM) or other form of software-based authorization information. Such data may include both SIM credentials and SSIM parameters. SSIM parameters may include SIM algorithms having specific applicability to the network operator associated with the credential server 60.

At Step 15, the credential server 60 encrypts the permanent subscription credentials using the public key of the mobile device 32, $PuK_x$, and sends them to the mobile device 32. In another embodiment, the credential server uses the temporary key, $K_{tx}$, to encrypt the permanent subscription credentials. Doing so, however, raises a possible security implication because $K_{tx}$ is derived from the secret key $K_{px}$, which is also held at the directory server 10.

At Step 16, the mobile device receives the encrypted permanent subscription credentials, decrypts them, and installs them, e.g., within its trusted module 44. This process may include any needed SIM or other software updating. Regardless, the mobile device 32 is now provisioned with permanent subscription credentials, giving the mobile device 32 access to home and visitor wireless communication networks within any limits established by those credentials.

A basic but non-limiting idea that is realized by the above arrangement is that mobile device manufacturers are permitted to initially provision mobile devices 32 in such a way that they can be later activated (permanently provisioned) using over-the-air activation though any number of participating network operators. This arrangement thus allows a mobile device 32 to gain temporary wireless communication network access using preliminary subscription identity information, and then use that access to obtain the address of and connection to a credential server that will provide it with permanent subscription information. Put simply, a potentially large number of different network operators may agree to participate in the described arrangement, and communicatively link their respective wireless communication networks to the directory server 10 (or to any one in a number of different directory servers 10).

Thus, a system and method for facilitating over-the-air mobile communication device activation are presented herein. However, it should be understood that the foregoing description and the accompanying drawings represent non-limiting examples of the methods, systems, and individual apparatuses taught herein. As such, the present invention is not limited by the foregoing description and accompanying drawings. Instead, the present invention is limited only by the following claims and their legal equivalents.

What is claimed is:

1. A method of facilitating over-the-air mobile communication device activation comprising, at a centralized device directory server:

storing a device record that comprises preliminary subscription credential information for a mobile device;

sending at least part of the preliminary subscription credential information securely to an initial provisioning party, for use in initially provisioning the mobile device;

receiving a device identifier for the mobile device from a credential server of a given network operator associated with an intended end-user of the mobile device, and correspondingly linking network address information of the credential server to the device record;

receiving a validation request from an authentication server, responsive to the mobile device attempting to access a wireless communication network using the preliminary subscription credential information;

sending an authentication vector to the authentication server that is based on a secret key included in the preliminary subscription credential information, if the preliminary subscription credential information for the mobile device is valid;

receiving a credential server address request from the mobile device, subsequent to the mobile device gaining temporary access to the wireless communication network via the authentication vector; and sending network address information for the credential server to the mobile device, as linked in the device record stored for the mobile device.

2. The method of claim 1, wherein storing the device record comprises storing a Preliminary International Mobile Subscriber Identity, PIMSI, and the secret key for the mobile device.

3. The method of claim 2, wherein receiving the device identifier for the mobile device from the credential server of the given network operator associated with the intended end-user of the mobile device comprises receiving a Public Device Identifier, PDI, that is derived from the Preliminary International Mobile Subscriber Identity, PIMSI, of the mobile device, and further comprising identifying the device record for the mobile device from the Public Device Identifier, PDI, and linking the device record to the network address information of the credential server.

4. The method of claim 2, further comprising initially provisioning a trusted module of the mobile device with the Preliminary International Mobile Subscriber Identity, PIMSI, the secret key, and a public/private key pair, and further provisioning the mobile device with network address information for the centralized device directory server and a listing of network operators that support temporary wireless communication network access via use of the Preliminary International Mobile Subscriber Identity, PIMSI.

5. The method of claim 4, further comprising gaining the temporary access to the wireless communication network by the mobile device based on the mobile device providing the Preliminary International Mobile Subscriber Identity, PIMSI, to the wireless communication network, and the wireless communication network forwarding the Preliminary International Mobile Subscriber Identity, PIMSI, to the authentication server for transfer to the centralized device directory server.

6. The method of claim 5, further comprising gaining access to the credential server of the given network operator by the mobile device, based on the mobile device receiving the network address information for the credential server from the centralized device directory server, and sending a credential request from the mobile device to the credential server, said credential request including the public key of the public/private key pair stored in the mobile device, and said credentialing request protected by a temporary key derived from the secret key stored in the mobile device.

7. The method of claim 6, further comprising, at the credential server, verifying the credentialing request from the mobile device, and generating a Soft Subscriber Identity Module, SSIM, and sending the SSIM to the mobile device in encrypted form using the public key of the mobile device, for use by the mobile device in installing permanent subscription credentials for the given network operator.

8. The method of claim 2, further comprising, at the centralized device directory server, deriving a second secret key from the secret key, and sending the second secret key for storage at the credential server in association with end-user subscriber data, for later use in protecting Soft Subscriber Identity Module, SSIM, information generated by the credential server and sent over-the-air to the mobile device.

9. A system for facilitating over-the-air mobile communication device activation including a centralized device directory server that comprises one or more processing circuits configured to:
  store a device record that comprises preliminary subscription credential information for a mobile device;
  send at least part of the preliminary subscription credential information securely to an initial provisioning party, for use in initially provisioning the mobile device;
  receive a device identifier for the mobile device from a credential server of a given network operator associated with an intended end-user of the mobile device, and correspondingly link network address information of the credential server to the device record;
  receive a validation request from an authentication server, responsive to the mobile device attempting to access a wireless communication network using the preliminary subscription credential information;
  send an authentication vector to the authentication server that is based on a secret key included in the preliminary subscription credential information, if the preliminary subscription credential information for the mobile device is valid; and
  receive a credential server address request from the mobile device, subsequent to the mobile device gaining temporary access to the wireless communication network via the authentication vector, and to correspondingly send network address information for the credential server to the mobile device, as linked in the device record stored for the mobile device.

10. The system of claim 9, wherein the centralized device directory server is configured to store, as the device record, a Preliminary International Mobile Subscriber Identity, PIMSI, and the secret key for the mobile device.

11. The system of claim 10, wherein the centralized device directory server includes a communication interface configured to communicate directly or indirectly with the credential server, and to receive, as the device identifier for the mobile device, a Public Device Identifier, PDI, that is derived from the Preliminary International Mobile Subscriber Identity, PIMSI, of the mobile device, and wherein the centralized device directory server is configured to identify the device record for the mobile device from the Public Device Identifier, PDI, and link the device record to the network address information of the credential server.

12. The system of claim 10, further comprising an initial provisioning server configured to provision a trusted module of the mobile device with the Preliminary International Mobile Subscriber Identity, PIMSI, and the secret key, and to further provision the mobile device with network address information for the centralized device directory server, and a listing of network operators that support temporary wireless communication network access via use of the Preliminary International Mobile Subscriber Identity, PIMSI.

13. The system of claim 12, wherein the initial provisioning server is further configured to provision the trusted module of the mobile device with a public/private key pair for later use in over-the-air activation of the mobile device.

14. The system of 12, wherein the authentication server is communicatively coupled to the wireless communication network and is configured to receive the Preliminary International Mobile Subscriber Identity, PIMSI, and to correspondingly receive an authentication vector for the mobile station in response to transferring the Preliminary International Mobile Subscriber Identity, PIMSI, to the centralized device directory server for verification, and to return the authentication vector to the wireless communication network for granting temporary access to the mobile device.

15. The system of claim 14, wherein the centralized device directory server is configured to receive a credential server address request from the mobile device after the mobile device is granted temporary access based on the authentication vector, and to return the network address information of the credential server, as linked to the device record of the mobile device.

16. The system of claim 15, wherein the mobile device is configured to receive the network address information for the credential server from the centralized device directory, and correspondingly to send a credential request for permanent subscription credentials to the credential server, said credential request including the public key of the public/private key pair stored in the mobile device, and said credentialing request protected by a temporary key derived from the secret key of the mobile device.

17. The system of claim 16, wherein the credential server is configured to verify the credentialing request from the mobile device and correspondingly to generate a Soft Subscriber Identity Module, SSIM, and is further configured to send the SSIM to the mobile device in encrypted form as protected by the public key of the mobile device, for use by the mobile device in installing permanent subscription credentials for the given network operator.

18. The system of claim 9, wherein the centralized device directory server is configured to derive a second secret key from the secret key, and send the second secret key for storage at the credential server in association with end-user subscriber data, for later use in protecting Soft Subscriber Identity Module, SSIM, information generated by the credential server and sent over-the-air to the mobile device.

* * * * *

UNITED STATES PATENT AND TRADEMARK OFFICE
CERTIFICATE OF CORRECTION

PATENT NO. : 8,064,597 B2
APPLICATION NO. : 11/948352
DATED : November 22, 2011
INVENTOR(S) : Gehrmann It is certified that error appears in the above-identified patent and that said Letters Patent is hereby corrected as shown below:

In Column 4, Line 66, delete "(processsors," and insert -- (processors, --, therefor.

In Column 9, Line 8, delete "devices's" and insert -- device's --, therefor.

In Column 12, Line 14, in Claim 14, delete "of 12," and insert -- of claim 12, --, therefor.

Signed and Sealed this
Tenth Day of April, 2012

David J. Kappos
*Director of the United States Patent and Trademark Office*